(12) United States Patent
Papasakellariou et al.

(10) Patent No.: US 10,694,538 B2
(45) Date of Patent: *Jun. 23, 2020

(54) TRANSMISSION OF SCHEDULING ASSIGNMENTS IN MULTIPLE OPERATING BANDWIDTHS

(71) Applicant: Samsung Electronics Co., Ltd., Gyeonggi-do (KR)

(72) Inventors: Aris Papasakellariou, Houston, TX (US); Jin-Kyu Han, Seoul (KR); Joon-Young Cho, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/189,766

(22) Filed: Nov. 13, 2018

(65) Prior Publication Data

US 2019/0082455 A1 Mar. 14, 2019

Related U.S. Application Data

(63) Continuation of application No. 15/363,766, filed on Nov. 29, 2016, now Pat. No. 10,129,904, which is a
(Continued)

(51) Int. Cl.
   *H04W 72/12* (2009.01)
   *H04L 5/00* (2006.01)
   *H04W 72/04* (2009.01)

(52) U.S. Cl.
   CPC ....... *H04W 72/1278* (2013.01); *H04L 5/0007* (2013.01); *H04L 5/0053* (2013.01);
   (Continued)

(58) Field of Classification Search
   None
   See application file for complete search history.

(56) References Cited

U.S. PATENT DOCUMENTS 8,811,269 B2 8/2014 Papasakellariou et al.
2002/0159414 A1 10/2002 Kanemoto et al.
(Continued)

FOREIGN PATENT DOCUMENTS

CN 1365586 8/2002
CN 1722895 1/2006
(Continued)

OTHER PUBLICATIONS

NTT DoCoMo, "DL Layered Control Signal Structure in LTE-Advanced", 3GPP TSG RAN WG1 Meeting #54bis, Sep. 29, 2008.
(Continued)

*Primary Examiner* — Christine T Duong
(74) *Attorney, Agent, or Firm* — The Farrell Law Firm, P.C.

(57) ABSTRACT

Methods and apparatuses are described for wireless communication supporting carrier aggregation. The method includes monitoring, by a user equipment (UE), a downlink control channel in a first search space to receive first control information in the first search space; monitoring, by the UE, a downlink control channel in a second search space to receive second control information in the second search space; and receiving, by the UE, data on a first carrier based on the received first control information or on a second carrier based on the received second control information.

20 Claims, 12 Drawing Sheets

Related U.S. Application Data continuation of application No. 14/563,703, filed on Dec. 8, 2014, now Pat. No. 9,510,364, which is a continuation of application No. 12/629,524, filed on Dec. 2, 2009, now Pat. No. 8,908,593.

(60) Provisional application No. 61/119,216, filed on Dec. 2, 2008.

(52) U.S. Cl.
CPC .......... *H04L 5/0091* (2013.01); *H04W 72/04* (2013.01); *H04W 72/1289* (2013.01)

(56) References Cited

U.S. PATENT DOCUMENTS

| | | | |
|---|---|---|---|
| 2004/0210619 | A1 | 10/2004 | Balachandran et al. |
| 2008/0285513 | A1 | 11/2008 | Jung et al. |
| 2009/0088148 | A1* | 4/2009 | Chung ............... H04L 5/0007 455/423 |
| 2010/0118800 | A1 | 5/2010 | Kim et al. |
| 2010/0120423 | A1 | 5/2010 | Awad |
| 2010/0227569 | A1 | 9/2010 | Bala |
| 2010/0238870 | A1 | 9/2010 | Mitra et al. |
| 2011/0111785 | A1* | 5/2011 | Lindoff ............... H04W 40/16 455/513 |
| 2011/0128925 | A1 | 6/2011 | Lindoff |
| 2011/0194501 | A1 | 8/2011 | Chung |
| 2011/0194514 | A1 | 8/2011 | Lee et al. |
| 2011/0228877 | A1 | 9/2011 | Han et al. |
| 2011/0274066 | A1 | 11/2011 | Tee et al. |
| 2015/0334736 | A1 | 11/2015 | Chandra et al. |

FOREIGN PATENT DOCUMENTS

| | | |
|---|---|---|
| CN | 1801689 | 7/2006 |
| EP | 1816886 | 8/2007 |
| JP | 10-243371 | 9/1998 |
| KR | 1020060014283 | 2/2006 |
| KR | 1020080066778 | 7/2008 |
| KR | 1020080102026 | 11/2008 |
| WO | WO 00/64059 | 10/2000 |

OTHER PUBLICATIONS

Samsung, "Configuration of Carrier Indicator Information Element", 3GPP TSG RAN WG1 #59, Nov. 9, 2009.

Alcatel-Lucent, "Component Carrier Indication for Bandwidth Extension in LTE-A", 3GPP TSG-RAN WG1 #57bis, Jun. 29, 2009.

Motorola, "Search Space Definition: Reduced PDCCH Blind Detection for Split PDCCH Search Space", 3GPP TSG RAN1 #61bis, Jan. 14, 2008.

NTT DoCoMo, "PDCCH Allocation Based on Hashing Function Generation Method for PDCCH Blind Decoding", 3GPP TSG RAN WG1 Meeting #52bis, Mar. 31, 2008.

Samsung: "PDCCH Structure for LTE-A", 3GPP TSG RAN WG1 #55, R1-084165, Nov. 10, 2008.

3GPP TR 25.813, 3rd Generation Partnership Project; Technical Specification Group Radio Access Network; Evolved Universal Terrestrial Radio Access (E-UTRA) and Evolved Universal Terrestrial Radio Access Network (E-UTRAN); Radio Interface Protocol Aspects (Release 7), Apr. 1, 2006.

Nokia, Nokia Siemens Networks, "L1 Control Signaling with Carrier Aggregation in LTE-Advanced", R1-083730, 3GPP TSG RAN-WG1 Meeting #54bis, Sep. 29-Oct. 3, 2008, 7 pages.

ZTE, "Downlink Control Structure for LTE-A", R1-090628, 3GPP TSG-RAN WG1 meeting #56, Feb. 9-13, 2009, 5 pages.

European Search Report dated Jun. 1, 2015 issued in counterpart application No. 15151001.33-1854, 8 pages.

Korean Office Action dated Oct. 19, 2015 issued in counterpart application No. 10-2011-7015205, 6 pages.

Chinese Office Action dated Sep. 5, 2016 issued in counterpart application No. 201410096461.3, 8 pages.

\* cited by examiner

TRANSMISSION OF SCHEDULING ASSIGNMENTS IN MULTIPLE OPERATING BANDWIDTHS

PRIORITY

The present application is a continuation application of U.S. patent application Ser. No. 15/363,766, which was filed in the U.S. Patent and Trademark Office (USPTO) on Nov. 29, 2016, which is a continuation application of U.S. patent application Ser. No. 14/563,703, which was filed in the USPTO on Dec. 8, 2014, and issued as U.S. Pat. No. 9,510,364 on Nov. 29, 2016, which is a continuation application of U.S. patent application Ser. No. 12/629,524, which was filed in the USPTO on Dec. 2, 2009, and issued as U.S. Pat. No. 8,908,593 on Dec. 9, 2014, and claims priority under 35 U.S.C. § 119(e) to U.S. Provisional Application No. 61/119,216, which was filed in the USPTO on Dec. 2, 2008, the entire content of each of which is incorporated herein by reference.

BACKGROUND OF THE INVENTION

1. Field of the Invention

The present invention relates generally to wireless communication systems and, more specifically, to the transmission of control signals conveying scheduling assignments for data reception or data transmission in multiple distinct bandwidths of a communication system.

2. Description of the Art

Unicast communication systems consist of a DownLink (DL) and of an UpLink (UL). The DL conveys transmissions of signals from a serving Base Station (BS or Node B) to User Equipments (UEs). The DL signals consist of data signals carrying the information content, control signals, and Reference Signals (RS), which are also known as pilot signals. The data signals are transmitted from the serving Node B to the respective UEs through the Physical Downlink Shared CHannel (PDSCH). The UL conveys transmissions of signals from UEs to their serving Node B. The UL signals also consist of data signals, control signals, and RSs. The data signals are transmitted from UEs to their serving Node B through the Physical Uplink Shared CHannel (PUSCH).

A UE, which is also commonly referred to as a terminal or a mobile station, may be fixed or mobile and may be a wireless device, a cellular phone, a personal computer device, etc. A Node B is generally a fixed station and may also be referred to as a Base Transceiver System (BTS), an access point, or some other related terminology.

The DL control signals may be of broadcast or UE-specific (unicast) nature. Broadcast control signals convey system information to all UEs. Further, UE-specific control signals can be used, among other purposes, to provide to UEs Scheduling Assignments (SAs) for PDSCH reception (DL SAs) of PUSCH transmission (UL SAs). The transmission of UE-specific control signals from the serving Node B to UEs is commonly through the Physical Downlink Control CHannel (PDCCH). The UL control signals include acknowledgement signals associated with the application of Hybrid Automatic Repeat reQuest (HARQ) for PDSCH transmissions and Channel Quality Indication (CQI) signals informing the serving Node B of the channel conditions the UE experiences in the DL. In the absence of any data transmission, a UE transmits these control signals through the Physical Uplink Control CHannel (PUCCH).

Typically, the PDCCH is a major part of the total DL overhead and directly impacts the achievable DL throughput. One method for reducing PDCCH overhead is to scale its size according to the resources required to transmit the SAs during each PDSCH Transmission Time Interval (TTI). In $3^{rd}$ Generation Partnership Project (3GPP) Long Term Evolution (LTE), where the Node B uses Orthogonal Frequency Division Multiple Access (OFDMA) as the DL transmission method, a Control Channel Format Indicator (CCFI) parameter transmitted through the Physical Control Format Indicator CHannel (PCFICH) indicates the number of OFDM symbols occupied by the PDCCH.

FIG. 1 illustrates the PDCCH transmission in the DL TTI, which for simplicity, is assumed to consist of one sub-frame having M OFDM symbols.

Referring to FIG. 1, the PDCCH 120 occupies the first N symbols of the total symbols 110. The remaining M-N symbols 130 of the sub-frame are assumed to be primarily used for the PDSCH transmission. The PCFICH 140 is transmitted in some sub-carriers, which are also referred to as Resource Elements (REs), of the first symbol. Certain sub-frame symbols also contain RS REs 150 and 160 for each of the Node B transmitter antennas, respectively, which in FIG. 1 are assumed to be two. The main purposes of the RS are to enable a UE to obtain a channel estimate for its DL channel medium and to perform other measurements and functions.

Alternatively, additional control channels may also be transmitted in the PDCCH region 120, even though they are not illustrated in FIG. 1. For example, assuming the use of HARQ for PUSCH data transmissions, a Physical Hybrid-HARQ Indicator CHannel (PHICH) may be transmitted by the Node B in a similar manner as the PCFICH to indicate to groups of UEs whether or not their previous PUSCH transmission was correctly received by the Node B.

The Node B may separately code and transmit each of the DL SAs and UL SAs in the PDCCH FIG. 2 illustrates a processing chain for an SA coding.

Referring to FIG. 2, the SA information bits 210, which convey the information for PDSCH reception or PUSCH transmission to a UE, are appended Cyclic Redundancy Check (CRC) bits in step 220, and are subsequently encoded in step 230, for example using a convolutional code, rate matched to the assigned resources in step 240, and transmitted in step 250. Consequently, each UE performs multiple decoding operations in its respective PDCCH region to determine whether it is assigned a DL SA or an UL SA. Typically, the CRC of each SA is scrambled with the IDentity (ID) of the UE the SA is intended for (not shown). After descrambling with its ID, a UE can determine whether an SA is intended for it by performing a CRC check.

In FIG. 3, the inverse operations of those illustrated in FIG. 2 are performed for SA decoding at the UE receiver.

Referring to FIG. 3, the received SA 310, is rate de-matched in step 320, decoded in step 330, and then the CRC is extracted in step 340. After CRC extraction, the SA information bits are obtained in step 350. As described above, if the CRC check passes, the UE may consider the SA as its own.

The SA information bits correspond to several fields such as, for example, a Resource Allocation (RA) field indicating the part of the operating BandWidth (BW) allocated to a UE for PDSCH reception (DL SA) or PUSCH transmission (UL SA), a Modulation and Coding Scheme (MCS) field, a field related to the HARQ operation, etc. Normally, the BW unit for PDSCH or PUSCH transmissions consists of several REs, such as, for example, 12 REs, and will be referred to herein as a Resource Block (RB).

In order to assist a UE with the multiple decoding operations, the REs carrying each SA are grouped into Control Channel Elements (CCEs) in the logical domain. For a given number of SA bits in FIG. 2, the number of CCEs for the SA transmission depends on the channel coding rate (e.g., Quadrature Phase Shift Keying (QPSK) as the modulation scheme). For a UE with low Signal-to-Interference and Noise Ratio (SINR), the serving Node B may use a low channel coding rate for the respective SA transmission in order to achieve a desired BLock Error Rate (BLER). For a UE with high SINR, the serving Node B may use a high channel coding rate for the respective SA transmission in order to achieve the same desired BLER. Therefore, the SA transmission to a UE experiencing a high SINR in the DL of the communication system typically requires more CCEs than that the SA transmission to a UE experiencing a low SINR (different power boosting of the REs used for a CCE transmission may compensate to an extent for the difference in coding rates in order to achieve the same SA BLER). Typical CCE aggregations for an SA transmission are assumed to follow a "tree-based" structure consisting, for example, of 1, 2, 4, and 8 CCEs.

For the SA decoding process, a UE may determine a search space for candidate SAs, after it restores the CCEs in the logical domain (prior to CCE interleaving), according to a common set of CCEs for all UEs (UE-common search space) and a UE-specific set of CCEs (UE-specific search space). The UE-specific search space may be determined according to a pseudo-random function having as inputs UE-common parameters, such as the sub-frame number or the total number of CCEs, and UE-specific parameters such as the identity assigned to a UE (UE_ID).

For example, in 3GPP LTE, for CCE aggregation levels $L \in \{1,2,4,8\}$, the CCEs corresponding to SA candidate m are given by $L \cdot \{(Y_k+m) \mod \lfloor N_{CCE,k}/L \rfloor\}+i$ where $N_{CCE,k}$ is the total number of CCEs in sub-frame k, $i=0, \ldots, L-1$, $m=0, \ldots, M^{(L)}-1$, and $M^{(L)}$ is the number of SA candidates to monitor in a search space (UE-common or UE-specific). Exemplary values of $M^{(L)}$ for $L \in \{1,2,4,8\}$ in the UE-specific search space are, respectively, $\{6, 6, 2, 2\}$. The variable $Y_k$ is defined as $Y_k=(A \cdot Y_{k-1}) \mod D$, where $Y_{-1}=UE\_ID \neq 0$, $A=39827$ and $D=65537$.

FIG. 4 illustrates construction and transmission of SAs using CCEs.

Referring to FIG. 4, the CCEs are serially numbered in the logical domain 400. After channel coding and rate matching, as shown in FIG. 2, the encoded SA bits are mapped to CCEs in the logical domain. More specifically, the first 4 CCEs (L=4), CCE1 401, CCE2 402, CCE3 403, and CCE4 404 are used for the SA transmission to UE1. The next 2 CCEs (L=2), CCE5 411 and CCE6 412, are used for the SA transmission to UE2. The next 2 CCEs (L=2), CCE7 421 and CCE8 422, are used for the SA transmission to UE3. Finally, the last CCE (L=1), CCE9 431, is used for the SA transmission to UE4.

The SA bits may be scrambled in step 440 using binary scrambling code, which is typically cell-specific, and are subsequently modulated in step 450. Each CCE is further divided into mini-CCEs. For example, a CCE consisting of 36 REs can be divided into 9 mini-CCEs, each consisting of 4 REs. Interleaving is applied among mini-CCEs (blocks of 4 QPSK symbols) in step 460. For example, a block interleaver, as used in 3GPP LTE, may be used where the interleaving is performed on symbol-quadruplets (4 QPSK symbols corresponding to the 4 REs of a mini-CCE) instead of on individual bits.

After interleaving the mini-CCEs, the resulting series of QPSK symbols may be shifted by J symbols in step 470, and then each QPSK symbol is mapped to an RE in the PDCCH region of the DL sub-frame in step 480.

Accordingly, in addition to the RS from the two Node B transmitter antennas 491 and 492 and other control channels, such as the PCFICH 493 and the PHICH (not shown), the REs in the PDCCH contain QPSK symbols corresponding to the SAs for UE1 494, UE2 495, UE3 496, and UE4 497.

In order to support higher data rates and enable scheduling of signal transmissions over BWs larger than the BWs of Component Carriers (CCs) supporting legacy communication systems, aggregation of multiple CCs is typically considered. For example, to support communication over 100 MHz, aggregation of five 20 MHz CCs can be used. For ease of reference herein, UEs operating over a single CC according to a pre-existing communication method will be referred to as "legacy-UEs" and UEs operating over multiple CCs will be referred to as "advanced-UEs".

Enabling the coexistence of SAs for legacy-UEs and advanced-UEs and designing the transmission of SAs for advanced-UEs are among the fundamental issues to be solved for the support of communications over multiple CCs.

FIG. 5 illustrates the principle of CC aggregation.

Referring to FIG. 5, an operating BW of 100 MHz 510 is constructed by the aggregation of 5 (contiguous, only for simplicity) CCs 521, 522, 523, 524, and 525, each having a BW of 20 MHz. Similarly to the sub-frame structure for communication over a single CC in FIG. 1, the sub-frame structure for communication over multiple CCs consists of a PDCCH region, such as for example 531 through 535, and a PDSCH region, such as for example 541 and 545.

The PDCCH region size varies per CC and its value is signaled by the PCFICH in the respective CC for the reference sub-frame period. By allowing the PDCCH to have a variable size, the respective overhead is minimized while practically avoiding PDSCH or PUSCH scheduling restrictions. Additionally, by configuring an advanced-UE to receive its PDSCH in predetermined CCs, the advanced-UE will only decode the PCFICH in these CCs and not all CCs, thereby minimizing the impact of PCFICH decoding errors. For CCs 1 and 5, the PDCCH size is respectively, PDCCH-1=3 symbols 531 and PDCCH-5=1 symbol 535. Because the PDSCH size in each CC is found by subtracting the respective PDCCH size from the sub-frame size, it is PDSCH-1=11 symbols 541 and PDSCH-5=13 symbols 545.

FIG. 5 also illustrates the direct extension of the PDCCH design for SA transmissions to advanced-UEs. The scheduling is independent among CCs and is performed by a PDCCH that is included within its respective CC, regardless of the number of CCs an advanced-UE may use for its PDSCH reception or PUSCH transmission. For example, the advanced-UE 550 receives two distinct SAs, SA2 552 and SA3 553, for individual PDSCH reception in the second and/or third CCs, respectively, and the advanced-UE 560 receives SA5 565 for PDSCH reception in the fifth CC. Different transport blocks are associated with different SAs.

However, a disadvantage of using an individual SA in each CC is that the advanced-UE will perform as many as 5 times (for the exemplary setup of 5 CCs in FIG. 5) the number of decoding operations a legacy-UE has to perform in order to identify the SAs in all possible CCs.

Another design issue is the multiplexing of CCEs corresponding to SAs for legacy-UEs and advanced-UEs without affecting the SA decoding process for legacy-UEs or increasing the number of decoding operations for advanced-UEs.

SUMMARY OF THE INVENTION

Accordingly, the present invention has been designed to solve at least the aforementioned problems in the prior art and the present invention provides methods and apparatus for the transmission of Scheduling Assignments (SAs) by a base station in multiple Component Carrier (CCs) of a communication system. The SAs provide scheduling information to a User Equipment (UE) for Physical Downlink Shared CHannel (PDSCH) reception or Physical Uplink Shared CHannel (PUSCH). The SAs are transmitted using Control Channel Elements (CCEs) in a Physical Downlink Control CHannel (PDCCH).

An aspect of the present invention is to support scheduling of PDSCH receptions or PUSCH transmissions in multiple CCs.

Another aspect of the present invention is to simplify and reduce the SA decoding operations an advanced-UE performs.

Another aspect of the present invention is to improve the detection reliability of SAs for advanced-UEs.

Another aspect of the present invention is to define the multiplexing of CCEs for SAs corresponding to legacy-UEs and of CCEs for SAs corresponding to advanced-UEs, without affecting the SA decoding process of legacy-UEs.

In accordance with an aspect of the present invention, a method is provided for wireless communication supporting carrier aggregation. The method includes monitoring, by a user equipment (UE), a downlink control channel in a first search space to receive first control information in the first search space; monitoring, by the UE, a downlink control channel in a second search space to receive second control information in the second search space; and receiving, by the UE, data on a first carrier based on the received first control information or on a second carrier based on the received second control information.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Certain embodiments of the present invention will be described more fully hereinafter with reference to the accompanying drawings. This invention may, however, be embodied in many different forms and should not be construed as limited to the specific embodiments set forth herein. Rather, these embodiments are provided so that this disclosure will be thorough and complete and will fully convey the scope of the present invention to those skilled in the art.

Additionally, although the present invention is described in relation to an Orthogonal Frequency Division Multiple Access (OFDMA) communication system, it also applies to all Frequency Division Multiplexing (FDM) systems in general and to Single-Carrier Frequency Division Multiple Access (SC-FDMA), OFDM, FDMA, Discrete Fourier Transform (DFT)-spread OFDM, DFT-spread OFDMA, SC-OFDMA, and SC-OFDM in particular.

In accordance with an embodiment of the present invention, an advanced-UE is semi-statically configured with the CCs over which it may have PDSCH reception (DL CCs) or PUSCH transmission (UL CCs). The transmission of DL SAs and UL SAs to an advanced-UE is over the Configured CCs (CCCs) of PDSCH reception and a different transport block is associated with each DL SA or UL SA.

Each DL SA or each UL SA is transmitted from the Node B to an advanced-UE in one DL CCC. The PDSCH reception associated with a DL SA may be in the DL CCC of the DL SA transmission or it may be over multiple DL CCCs addressed by the DL SAs. Correspondingly, the PUSCH reception associated with a UL SA may be in one UL CCC or it may be over multiple UL CCCs addressed by the UL SAs. In order to associate a UL CCC with the UL SA transmitted in a DL CCC, a one-to-one mapping can be preconfigured between DL CCCs and UL CCCs, or an implicit ordering of the UL SAs can indicate the UL CCC, or explicit indexing can be included in the UL SA to indicate the UL CCC for PUSCH transmission as it will be later described.

Figure 5:
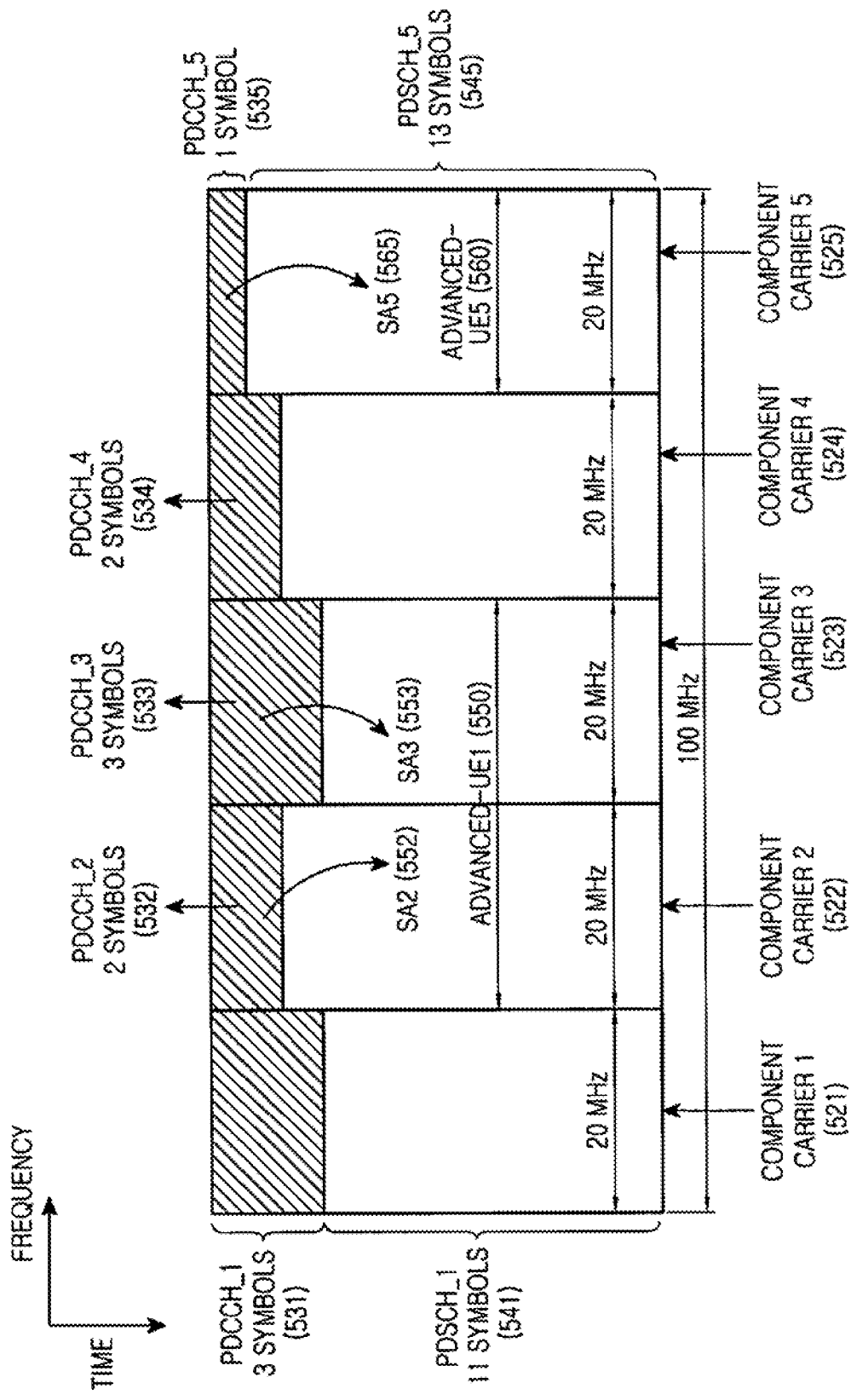
FIG. 5 is a diagram illustrating a principle of component carrier aggregation.

An advanced-UE can be configured with a primary DL CCC from among its DL CCCs. The primary DL CCC serves as reference relative to the remaining, secondary DL CCCs. For example, referring to FIG. 5, CC 2 may be the primary DL CCC for an advanced-UE1 while CC 3 is a secondary DL CCC. The secondary DL CCCs may also be ordered, in which case, the DL CCCs can be referred to as primary, first secondary, second secondary, etc. Equivalently, the DL CCCs for an advanced-UE may be ordered as first DL CCC, second DL CCC, etc., and a DL SA or an UL SA is transmitted in the first DL CCC. For simplicity, the "primary" and "secondary" terminology will be used herein, but the terms "first", "second", etc., also applies.

A search and decode process of DL SAs for an advanced-UE will now be described below.

To maintain a similar number of decoding operations for an advanced-UE as for a legacy-UE and avoid disrupting the SA search and decode process of legacy-UEs, in accordance with an embodiment of the present invention, locations in a logical domain of CCEs for a DL SA to the advanced-UE in secondary DL CCCs is determined from locations in the logical domain of CCEs for a DL SA in a primary DL CCC. The CCEs forming the DL SA candidates for an advanced-UE in each DL CCC can be treated in similar fashion by the DL SA search and decode process as the CCEs forming the SA candidates for a legacy-UE. Moreover, as it is subsequently described, an advanced-UE can follow a DL SA search and decode process with similar complexity as for a legacy-UE, regardless of the number of its DL CCCs, based on the condition that the locations of the CCEs for a DL SA in a secondary DL CCC are determined from the locations of the CCEs for a DL SA in the primary DL CCC.

Figure 6:
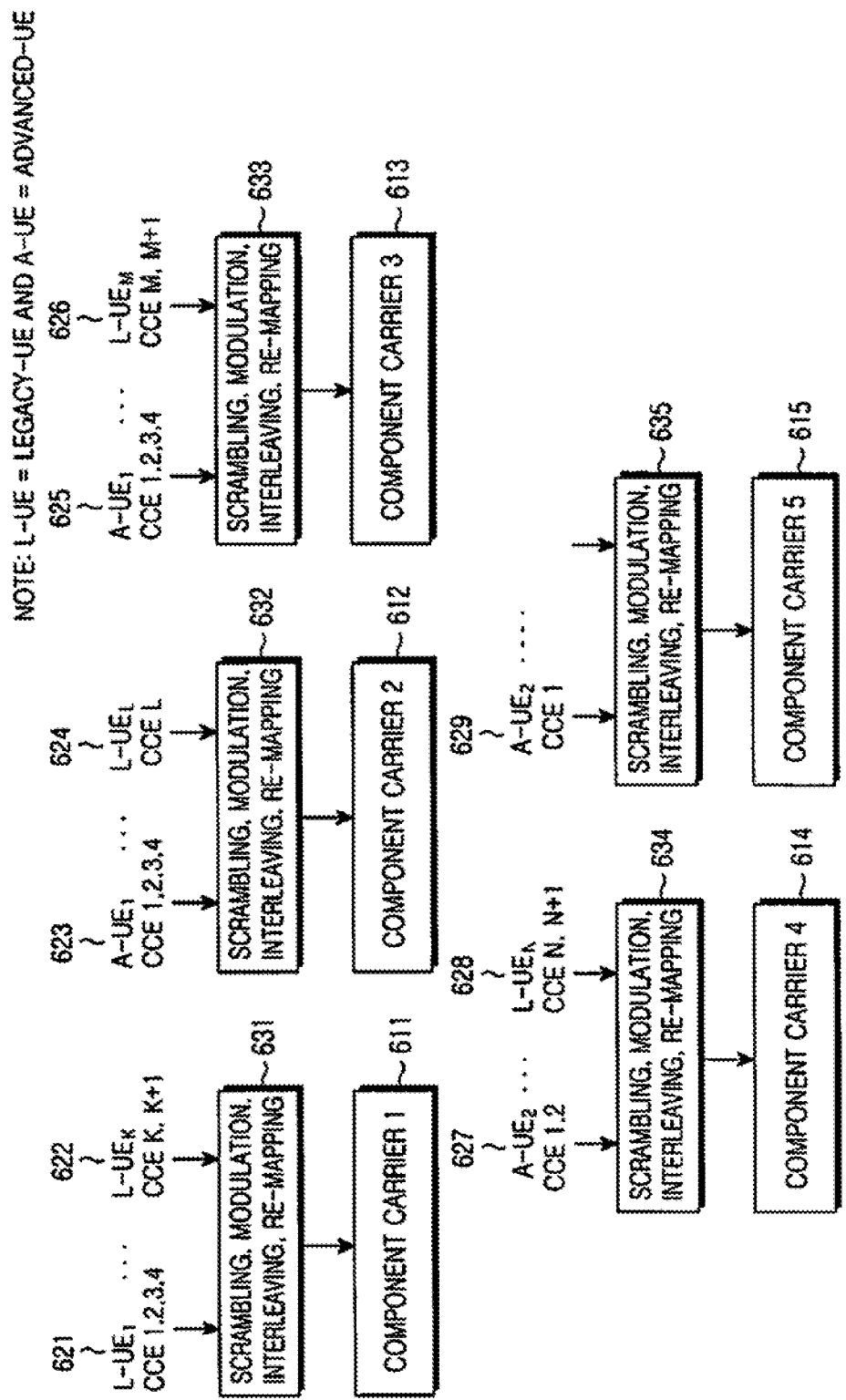
FIG. 6 is a diagram illustrating a placement of CCEs for SA transmission to advanced-UEs in multiple CCs and to legacy-UEs in a single CC in accordance with an embodiment of the present invention.

FIG. 6 is a diagram illustrating a placement of CCEs for SA transmission to advanced-UEs in multiple CCs and to legacy-UEs in a single CC in accordance with an embodiment of the present invention. More specifically, FIG. 6 illustrates five CCs as an example.

Referring to FIG. 6, a first CC 611 is configured to support only legacy-UEs, such as L-UE$_1$ 621, requiring 4 CCEs (1 through 4) for SA transmission and L-UE$_K$ 622, requiring 2 CCEs (K and K+1) for SA transmission. The second and third CCs 612 and 613 support a mixture of advanced-UEs, such as A-UE$_1$, and legacy-UEs, such as L-UE$_L$. A-UE$_1$ has 2 DL CCCs. The primary DL CCC is CC 2 and the secondary DL CCC is CC 3. Four CCEs are required for the SA transmission to A-UE$_1$. The same CCEs 1 through 4 are used in both the primary CCC 623 and the secondary CCC 625. SAs to legacy-UEs are also transmitted in CC 2, such as the SA to L-UE$_L$ using CCE L 624, and CC 3, such as the SA to L-UE$_M$ using CCE M and M+1 626.

CC 4 614 also supports a mixture of advanced-UEs and legacy-UEs and CC 5 615 supports only advanced-UEs. A-UE$_2$ also has 2 DL CCCs. The primary DL CCC is CC 4 and the secondary DL CCC is CC 5. For DL SA transmission to A-UE$_2$, two CCEs are used in the primary DL CCC 627 and one CCE is used in the secondary DL CCC 629. More CCEs are used to provide better coding protection for the DL SA transmission in the primary CCC because if the advanced-UE fails to decode it, the decoding of the DL SAs in the secondary DL CCCs will also fail, as the decoding of the DL SAs in the secondary DL CCCs will occur only after the DL SA in the primary DL CCC is found and only the respective CCEs in the secondary DL CCCs are considered. After arranging the CCEs in each CC in the logical domain as described above, the scrambling, modulation, interleaving, and RE-mapping process follows for each of CC 631, 632, 633, 634, and 635, as described above with reference to FIG. 4.

Figure 1:
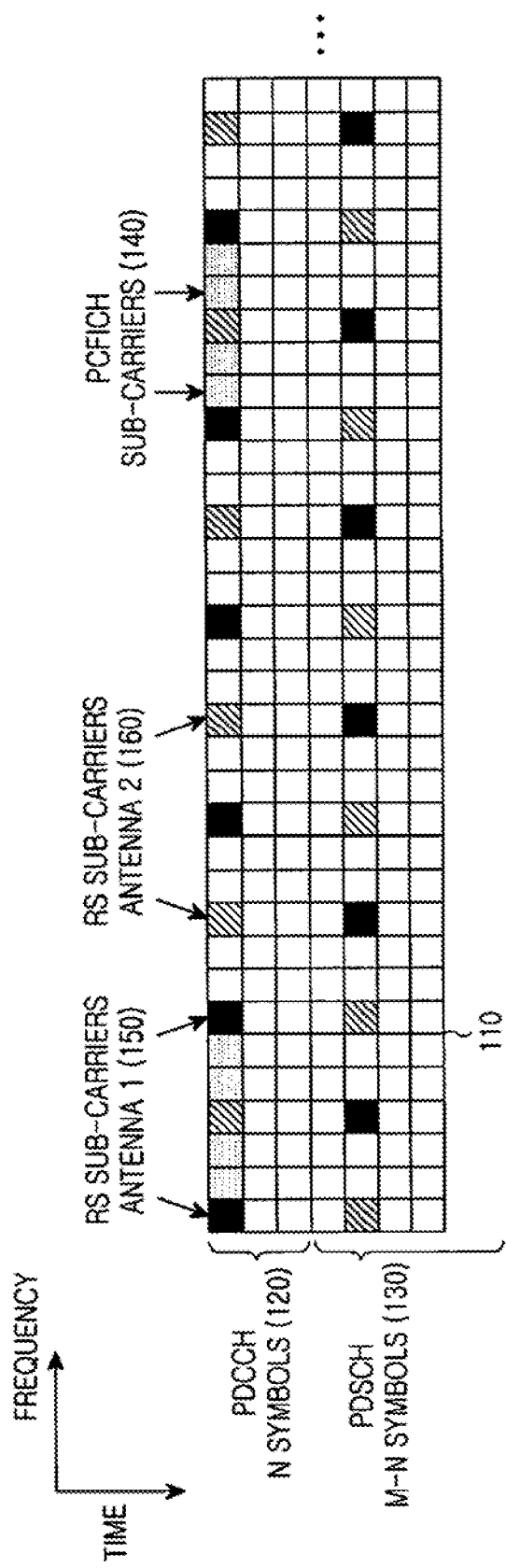
FIG. 1 is a diagram illustrating a conventional DL subframe structure for PDCCH and PDSCH transmissions in a DL of a communication system.
Figure 2:
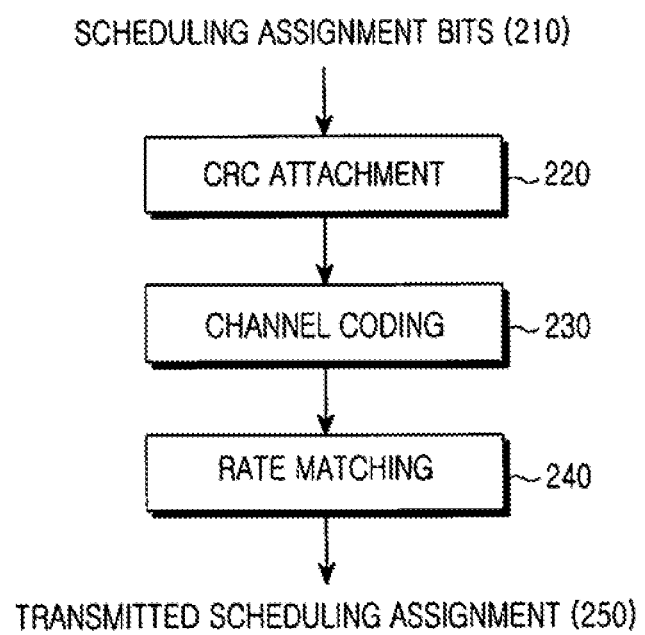
FIG. 2 is a block diagram illustrating a conventional coding process of an SA at a Node B.
Figure 3:
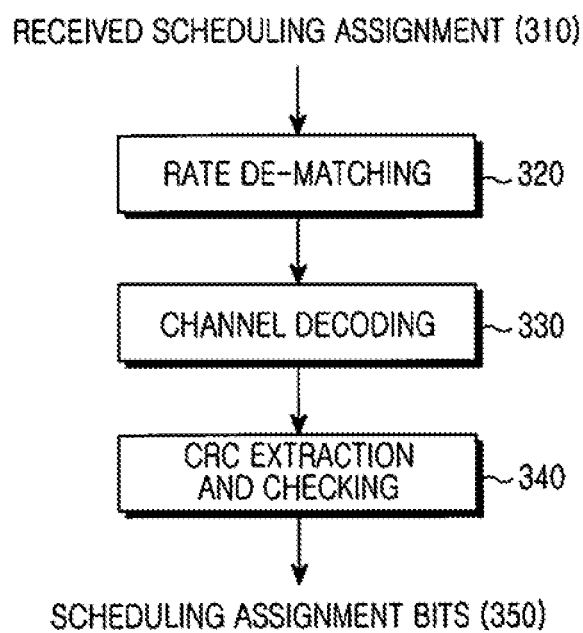
FIG. 3 is a block diagram illustrating a conventional decoding process of an SA at a UE.
Figure 4:
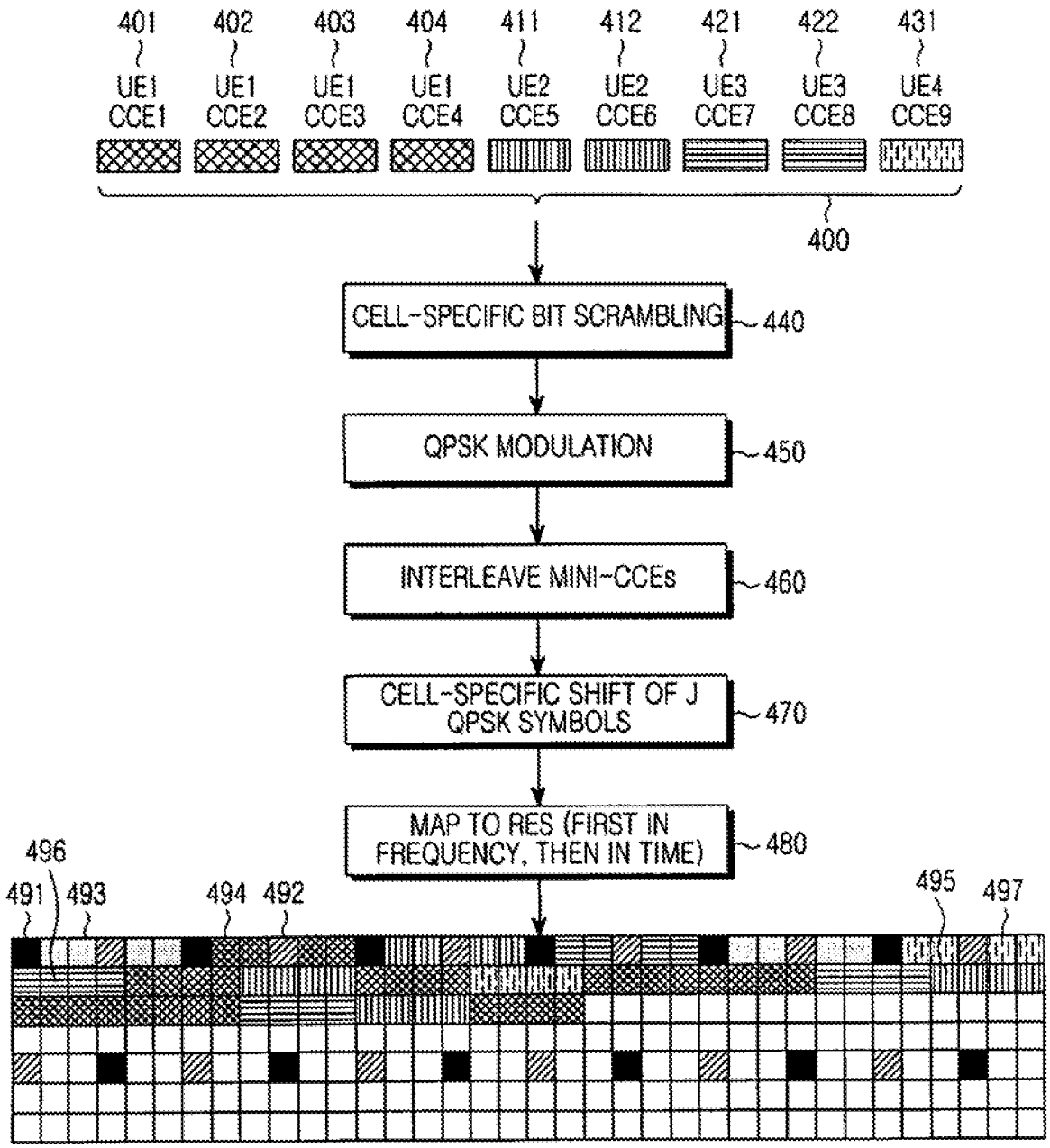
FIG. 4 is a diagram illustrating a conventional construction and transmission of SAs using CCEs in a PDCCH.

For each DL CCC, similar to a legacy-UE, an advanced-UE decodes the PCFICH to determine the respective PDCCH size and then performs the reverse functions of those illustrated in FIG. 4 by considering the REs carrying DL SA transmission for the DL SA search and decode process (that is, discarding predetermined REs carrying RS, PCFICH, PHICH, or predetermined transmissions of other channels). Subsequently, the advanced-UE de-interleaves, demodulates, and descrambles the REs to obtain the received CCEs. The DL SA search and decode process goes through the CCEs in the primary DL CCC.

Examples of CCE aggregation levels L for a DL SA transmission to either legacy-UEs or advanced-UEs are 1, 2, 4, and 8 CCEs (L ∈ {1,2,4,8}). The locations of CCEs for DL SA candidate m in the primary DL CCC are determined by the same function, $L \cdot \{(Y_k+m) \bmod \lfloor C_{CE,k}/L \rfloor \}+i$ as previously described, having the same arguments with the possible exception of the total number of CCEs, $N_{CCE,k}$, due to the possible different PDCCH sizes in the CCCs. If the reference advanced-UE finds a DL SA in its primary DL CCC, it searches for additional DL SAs in the secondary DL CCCs. Otherwise, the search and decode process terminates in the primary DL CCC.

If there is more than one secondary DL CCC, semi-static or dynamic indexing may apply for indicating the series with which DL SAs are placed in secondary DL CCCs, after the first DL SA in the primary DL CCC. For example, if in addition to its primary DL CCC an advanced-UE is configured with two secondary DL CCCs, the advanced-UE may be semi-statically configured through higher layers to search for a DL SA in the first secondary DL CCC before searching in the second secondary DL CCC. If no DL SA is found in the first secondary DL CCC, the search process may terminate.

Alternatively, an index may be included in the DL SA to indicate a next DL CCC having a DL SA, if any, thereby allowing dynamic indexing on a sub-frame basis. For example, for a total of 4 DL CCCs corresponding to one primary DL CCC and three secondary DL CCCs, a 2-bit index may be included in the DL SA to indicate the next secondary DL CCC having a DL SA (with a value of 0 indicating that no secondary DL CCC carries a DL SA).

Alternatively, a bit-map of 3 bits may be included in the DL SA in the primary DL CCC to indicate which of the secondary DL CCCs have a DL SA. Nevertheless, using no indexing is also possible and, in that case, the advanced-UE searches all secondary DL CCCs at the CCE locations determined after successfully decoding a DL SA in the primary DL CCC.

Figure 7:
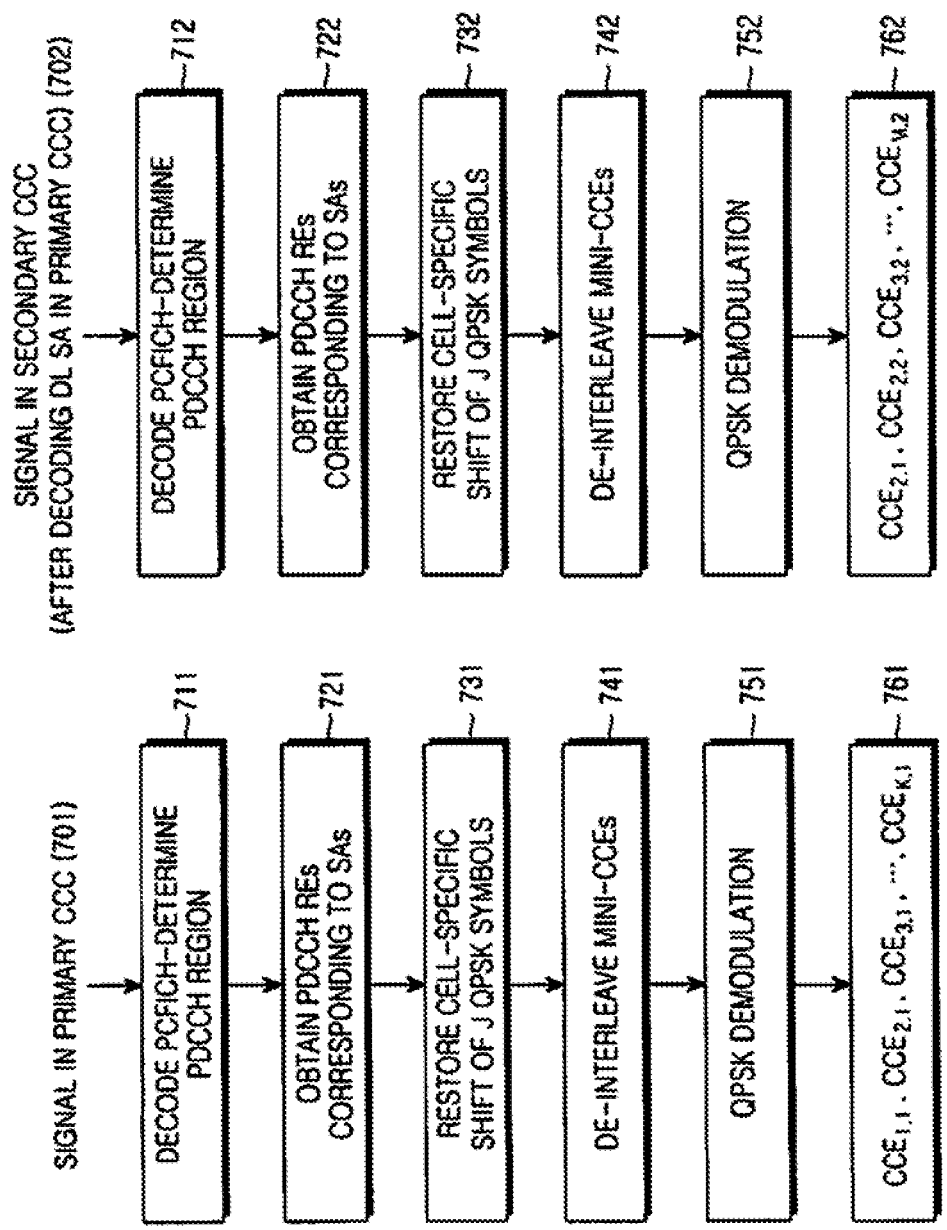
FIG. 7 is a diagram illustrating a determination of CCEs at a UE that are used to transmit SAs intended for a first CC and for a second CC in accordance with an embodiment of the present invention.

FIG. 7 is a diagram illustrating a determination of CCEs at a UE that are used to transmit SAs intended for a first CC and for a second CC in accordance with an embodiment of the present invention.

Referring to FIG. 7, the reference advanced-UE is configured for DL SA reception in 2 CCs, its primary DL CCC 701 and a secondary DL CCC 702. Upon the signal reception in the primary DL CCC, the advanced-UE decodes the PCFICH to determine the respective PDCCH region in step 711. After removing REs used for the transmission of RS, PCFICH, PHICH and other predetermined channels in step 721, the advanced-UE restores a cell-specific shift of J QPSK symbols, if any, in step 731, de-interleaves the mini-CCEs in step 741, and performs QPSK demodulation in step 751 to obtain the transmitted K CCEs $CCE_{1,1}$, $CCE_{2,1}$, $CCE_{3,1}$, ..., $CCE_{K,1}$ in step 761.

After the CCEs have been restored in the logical domain, the second step of the SA search and decode process determines search spaces in the primary DL CCC according to a common set of CCEs for all UEs (UE-common search space) and a UE-specific set of CCEs (UE-specific search space) as described above. If the advanced UE finds a DL SA in the primary DL CCC, it continues in the secondary DL CCC.

In the secondary DL CCC 702, similar to the primary DL CCC 701, the advanced-UE decodes the PCFICH to determine the respective PDCCH region in step 712. After removing REs used for the transmission of RS, PCFICH, PHICH and other predetermined channels in step 722, the advanced-UE restores a cell-specific shift of J QPSK symbols, if any, in step 732, de-interleaves the mini-CCEs in step 742, and performs QPSK demodulation in step 752 to obtain the transmitted M CCEs $CCE_{1,2}$, $CCE_{2,2}$, $CCE_{3,2}$, ..., $CCE_{M,2}$ in step 762.

After the CCEs have been restored in the logical domain, the second step of the DL SA search and decode process in the secondary DL CCC determines and decodes the candidate CCEs. This process is simpler than in the primary DL CCC as the candidate CCEs in the secondary DL CCC can be derived from the CCEs used by the DL SA in the primary DL CCC. That is, assuming that the DL SA in the primary DL CCC requires the same or better coding protection than the DL SA in a secondary CCE, aggregation levels L smaller than or equal to the level used for the DL SA in the primary DL CCC may be considered.

For example, if L=4 in the primary DL CCC, in the secondary DL CCC possible values can be L=1, 2, 4. For L=1, 4 decoding operations are needed (i.e., one decoding operation for each CCE). For L=2, 2 decoding operations are needed (i.e., one for the first 2 CCEs, and one for the last 2 CCEs). Finally, for L=4, 1 decoding operation is needed, which brings the total decoding operations to seven (7). Similarly, the largest number of decoding operations is 15 and is obtained for L=8 in the primary DL CCC and L=1, 2, 4, 8 in the secondary DL CCC. To minimize the decoding operations, the same CCE aggregation level L may be used in all DL CCCs.

Figure 8:
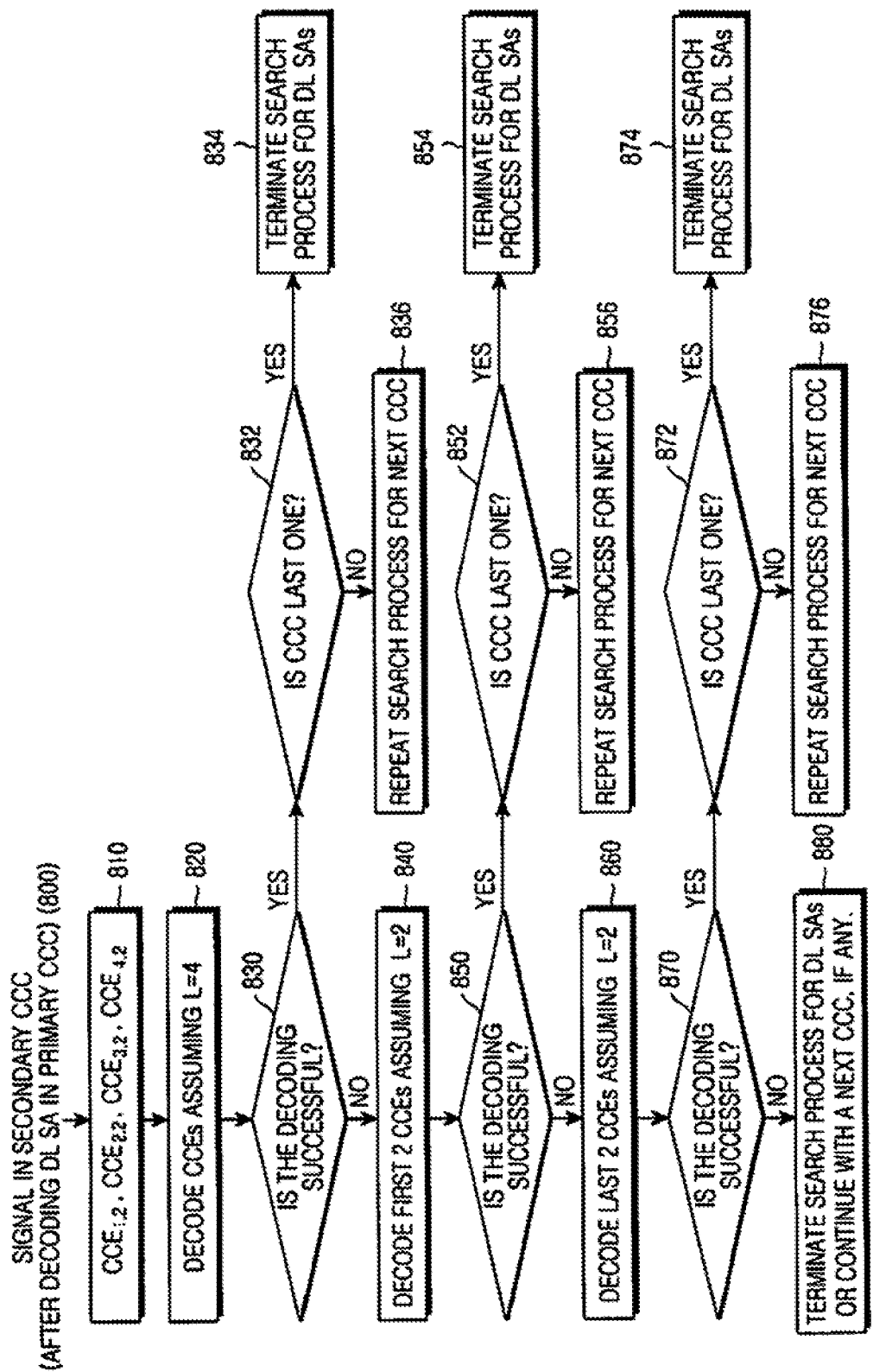
FIG. 8 is a diagram illustrating a search and decode process at a UE for a DL SA intended for a second CC, after decoding a DL SA intended for a first CC, in accordance with an embodiment of the present invention.

FIG. 8 is a diagram illustrating a search and decode process at a UE for a DL SA intended for a second CC, after decoding a DL SA intended for a first CC, in accordance with an embodiment of the present invention. More specifically, FIG. 8 illustrates a search process in a secondary DL CCC, assuming that a reference advanced-UE detects a DL SA in a primary DL CCC for L=4.

As described above, the CCEs considered by the search process in the secondary DL CCC are deterministically known from the CCEs for the DL SA in the primary DL CCC. This can be achieved, for example, either by using the same locations, or by applying a shift (for example, a predetermined shift depending on the PCFICH value in the secondary DL CCC), or by using a pseudo-random function, etc. Arguments (i.e. independent variables) to the pseudo-random function can be the sub-frame number, the CC number, the PCFICH value, and the UE_ID.

FIG. 8 assumes that possible CCE aggregation levels in a secondary DL CCC are equal to or greater than a CCE aggregation level used for a DL SA in a primary DL CCC. The first secondary DL CCC examined by the search process, after detecting a DL SA in the primary DL CCC, may be semi-statically or dynamically configured to the advanced-UE by its serving Node B or it can be randomly chosen by the advanced-UE among the secondary DL CCCs as it was previously described.

Referring to FIG. 8, after successfully decoding a DL SA in the primary DL CCC, the advanced-UE continues in a secondary DL CCC 800 determined by the indexing method, after completing the first step described in FIG. 7. In the secondary DL CCC, the advanced-UE considers only the CCEs 810 determined from the CCEs used for the DL SA in the primary DL CCC. For simplicity, only the L=4 and L=2 CCE aggregation levels are considered. The L=8 and L=1 CCE aggregation levels can be addressed, if needed, in the same manner. Moreover, as previously described, the CCE aggregation level L in the secondary DL CCCs may be kept the same as in the primary DL CCC (only one decoding operation will then be performed per secondary DL CCC).

In step 820, the advanced-UE first decodes the L=4 aggregation level. If the decoding is successful in step 830, as indicated by the CRC test, the advanced-UE examines if the secondary DL CCC is the last DL CCC in step 832. If the secondary DL CCC is the last DL CCC, the search process for DL SA terminates in step 834. However, if the secondary DL CCC is not the last DL CCC, the search process for DL SAs continues for the next secondary DL CCC in step 836.

If the decoding is not successful in step 830, another decoding is performed considering the first 2 CCEs in step 840. If the decoding is successful in step 850, the advanced-UE examines if the secondary DL CCC is the last DL CCC in step 852. If the secondary DL CCC is the last DL CCC, the search process for DL SA terminates in step 854. However, if the secondary DL CCC is not the last DL CCC, the search process continues for the next secondary DL CCC in step 856.

If the decoding is not successful in step 850, another decoding is performed considering the last 2 CCEs in step 860. If the decoding is successful in step 870, the advanced-UE examines if the secondary DL CCC is the last DL CCC in step 872. If the secondary DL CCC is the last DL CCC, the search process for DL SA terminates in step 874. However, if the secondary DL CCC is not the last DL CCC, the search process continues for a next secondary DL CCC in step 876.

If the decoding is not successful in step 870, the advanced-UE terminates the search process if the secondary DL CCC is either the last one or, otherwise, it continues the search process for a next secondary DL CCC in step 880. If more than one (1) CCE aggregation level is considered, the order with which the advanced-UE searches/decodes these aggregation levels may be arbitrary. For example, in FIG. 8, the L=2 CCE aggregation level may be searched before the L=4 one.

For the transmission of UL SAs in accordance with an embodiment of the present invention, for a first UL SA, the CCEs are located in the primary DL CCC and the same search process as for legacy-UEs applies (referred to as "a first approach"). The CCEs for all potential UL SAs, other than the first UL SA, are placed at predetermined locations relative to the CCEs for the first UL SA in the primary DL CCC. For example, the CCEs for UL SAs may be placed consecutive to the CCEs for the first UL SA, or shifted by a predetermined number of CCEs (which may depend on the PCFICH value in the primary DL CCC), or a pseudo-random mapping may apply.

For the transmission of UL SAs in accordance with another embodiment of the present invention, the UL SAs are distributed among the DL CCCs in a similar manner as for the DL SAs using the same indexing options as for the DL SAs where an UL CCC is associated with a DL CCC (referred to as "a second approach"). The locations of CCEs for UL SAs may follow the same principles as applied for the locations of CCEs for DL SAs as previously described and illustrated in FIG. 8. Accordingly, this description will not be repeated.

Figure 9:
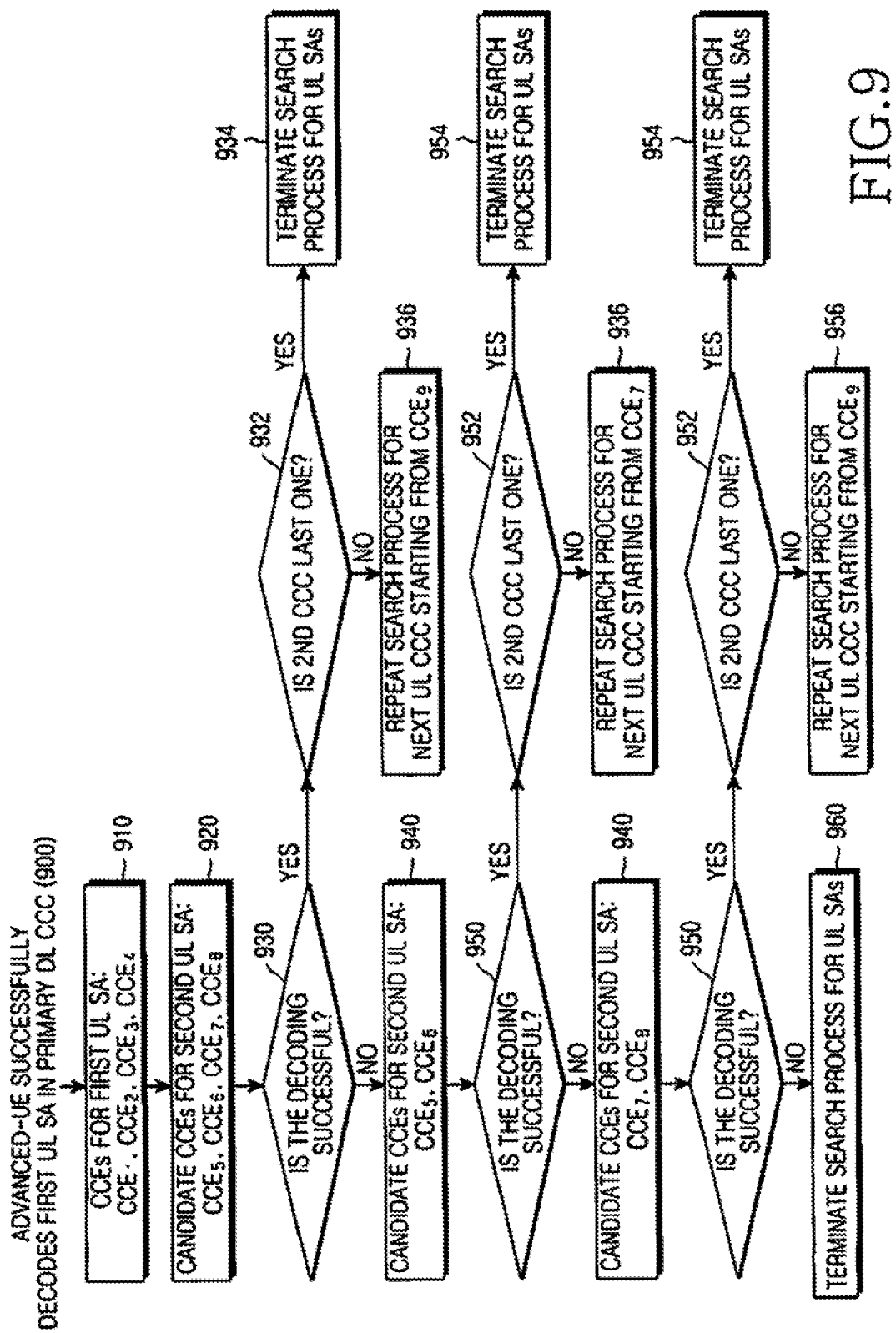
FIG. 9 is a diagram illustrating a search and decode process at a UE for a UL SA intended for a second CC, after decoding a UL SA intended for a first CC, in accordance with an embodiment of the present invention.

FIG. 9 is a diagram illustrating a search and decode process at a UE for a UL SA intended for a second CC, after decoding a UL SA intended for a first CC, in accordance with an embodiment of the present invention. More specifically, FIG. 9 illustrates the first approach described above, assuming that no indexing is used for indicating UL CCCs with scheduled PUSCH transmission for an advanced-UE.

Referring to FIG. 9, after the advanced-UE successfully decodes the first UL SA 900, which is assumed to consist of L=4 CCEs 910, using the same search and decode process as a legacy-UE, it examines predetermined CCEs which may contain additional UL SAs. For simplicity, the CCEs allocated to UL SAs are assumed to be consecutive and potential subsequent UL SAs are assumed to comprise of either L=4 CCEs or L=2 CCEs. Other CCE aggregation levels are also possible or the same CCE aggregation level may be used for all remaining UL SAs, if any. The next, second, and potential UL SA corresponding to the next UL CCC consists of the next 4 CCEs 920.

If the decoding is successful in step 930, as indicated by the CRC test, the advanced-UE examines if the UL CCC is the last UL CCC in step 932. If the UL CCC is the last UL CCC, the search process terminates 934. If the UL CCC is not the last UL CCC, the search process continues for a next UL CCC in step 936. However, if the decoding 930 is not successful, the next two (2) CCEs 940, after the CCEs used for the transmission of the first UL SA, are examined and correspond to the second UL CCC.

If the decoding is successful in step 950, the advanced-UE examines if the UL CCC is the last UL CCC in step 952. If the UL CCC is the last UL CCC, the search process terminates 954. However, if the UL CCC is not the last UL CCC, the search process continues for a next UL CCC in step 956.

If the decoding is not successful in step 950, the next two (2) CCEs 960, after the CCEs used for the transmission of the first UL SA and after the previous next two (2) CCEs, are examined.

If the decoding is successful in step 970, the advanced-UE examines if the UL CCC is the last UL CCC in step 972. If the UL CCC is the last UL CCC, the search process terminates in step 974. However, if the UL CCC is not the last UL CCC, the search process continues for a next UL CCC in step 976.

If the decoding is not successful in step 970, the UL SA search process either terminates, if all UL CCCs are examined for all possible CCE aggregation levels assumed in FIG. 9, or otherwise, the UL SA search process continues with additional CCE aggregation levels corresponding to the next UL CCC in step 980.

The above-described process assumes that the first UL SA corresponds to the first UL CCC. Therefore, the first UL CCC will always have to be scheduled a PUSCH transmission. To avoid this restriction, the first UL SA may also contain an index for indicating the UL CCCs with valid UL SAs. This index, e.g., a number of bits, may either depend on the number of UL CCCs a UE is configured with or it may be set to the total number of UL CCCs.

For example, for four (4) UL CCCs, a bit-map including 4 bits in the first UL SA can indicate the UL CCCs for which the advanced-UE has an UL SA, with the first UL SA corresponding to the first such UL CCC. If the advanced-UE is configured a smaller number of UL CCCs than the total number of UL CCCs, the remaining bits in the bit-map can be set to a predetermined value or they can have a different interpretation, such as, for example, for adjusting the resource used for subsequent transmission of HARQ acknowledgement signals from the serving Node B corresponding to the respective PUSCH transmission from the advanced-UE. Alternatively, each UL SA can be allowed to address all UL CCCs at the expense of additional bits required for the RA indication.

Figure 10:
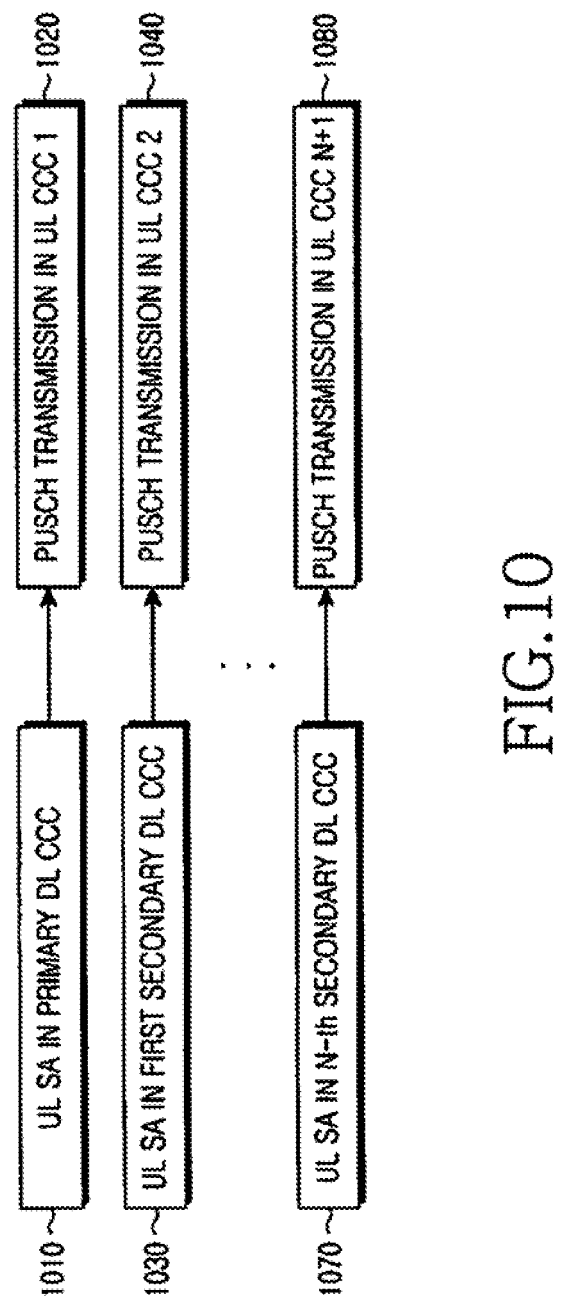
FIG. 10 is a diagram illustrating a one-to-one mapping between a DL CC conveying a UL SA transmission and a UL CC of a respective PUSCH transmission in accordance with an embodiment of the present invention.

FIG. 10 is a diagram illustrating a one-to-one mapping between a DL CC conveying a UL SA transmission and a UL CC of a respective PUSCH transmission in accordance with an embodiment of the present invention. More specifically, FIG. 10 illustrates the one-to-one mapping approach for determining the UL CCC to which the respective UL SA refers to assuming that the RA field in each UL SA addresses only one UL CCC. It is assumed that the second approach applies to the UL SA transmission, that is, UL SAs are transmitted in both the primary DL CCC and secondary DL CCCs and that the UL CCCs are ordered.

Referring to FIG. 10, when an UL SA is successfully decoded in the primary DL CCC 1010, the respective PUSCH transmission is in the first UL CCC 1020; when an UL SA is successfully decoded in the first secondary DL CCC 1030, the respective PUSCH transmission is in the second UL CCC 1040; and when an UL SA is successfully decoded in the N-th secondary DL CCC 1070, the respective PUSCH transmission in the (N+1)-th UL CCC 1080.

It is not necessary for an UL SA to exist or be successfully decoded in an intermediate of the DL CCCs in order for the search process to continue until the final UL SA is successfully decoded. Instead, the advanced-UE can simply continue the search process in subsequent DL CCCs mapped to respective UL CCCs. If the number of UL CCCs is larger than the number of DL CCCs, more than one UL CCCs are mapped to a DL CCC and the order of the UL CCCs is determined by the order of the CCEs for the respective UL SAs.

For example, for two (2) DL CCCs and three (3) UL CCCs, the first and second UL CCCs can be respectively mapped to the first and second DL CCCs and the third UL CCC can be mapped to the first DL CCC. The first and second approaches become equivalent if there is one DL CCC and multiple UL CCCs.

Figure 11:
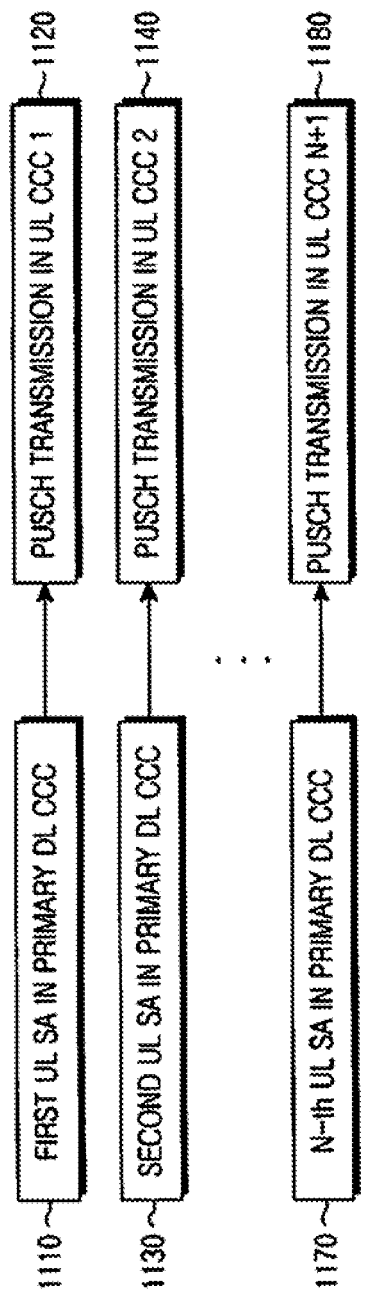
FIG. 11 is a diagram illustrating a method for mapping a UL CC for PUSCH transmission to a location of respective CCEs for a corresponding UL SA in accordance with an embodiment of the present invention.

FIG. 11 is a diagram illustrating a method for mapping a UL CC for PUSCH transmission to a location of respective CCEs for a corresponding UL SA in accordance with an embodiment of the present invention. More specifically, FIG. 11 illustrates an implicit mapping approach, based on each UL SA location, for determining the UL CCC to which the respective UL SA refers to. It is assumed that all UL SAs are transmitted using sequential CCEs, in the logical domain, in the primary DL CCC and each UL SA addresses only one UL CCC. Clearly, if the UL SAs are transmitted in different DL CCCs as assumed for the one-to-one mapping approach, the one-to-one mapping and implicit mapping approaches are equivalent and the description in FIG. 10 applies.

Referring to FIG. 11, the first UL SA in the primary DL CCC 1110 maps the respective PUSCH transmission in the first UL CCC 1120; the second UL SA in the primary DL CCC 1130 maps the respective PUSCH transmission in the second UL CCC 1140; and the N-th UL SA in the primary DL CCC 1170 maps the respective PUSCH transmission in the N-th UL CCC 1180. With explicit mapping, the UL CCCs can be signaled in each UL SA.

For example, four (4) UL CCCs can be addressed with 2 bits in each UL SA, e.g., '00' maps to the first UL CCC, '01' maps to the second UL CCC, '10' maps to the third UL CCC, and '11' maps to the fourth UL CCC. The UL SAs may be in the primary DL CCC or they may also be located in secondary DL CCCs, either through a predetermined mapping or randomly without any restrictions.

Alternatively, a bit-map may be used in the UL SA in the primary DL CCC to indicate the UL CCCs for which an UL SA is transmitted using one of the previously described mapping approaches. Explicit mapping of the UL CCCs can be avoided by extending the RA field in each UL SA to address the RBs in all UL CCCs.

The explicit mapping approach can also apply for the DL SAs and for scheduling HARQ re-transmissions. If each DL SA can only address one DL CCC, this DL CCC can be identified through explicit signaling.

For example, the DL SA may be transmitted in the primary DL CCC but the respective PDSCH transmission may be in a secondary DL CCC, which is identified through explicit mapping bits, which address the DL CCCs, in the DL SA. Therefore, if a HARQ re-transmission is to be scheduled in a secondary DL CCC, the respective DL SA can be transmitted in the primary DL CCC, even when there is no PDSCH transmission scheduled for the reference advanced-UE in the primary DL CCC.

An advanced-UE may also be scheduled multiple PDSCH receptions or multiple PUSCH transmissions in the same DL CCC or UL CCC, respectively.

For example, a first PDSCH reception may correspond to a Voice over Internet Protocol (VoIP) packet while a second PDSCH reception may correspond to the download of a data file. These PDSCH receptions or PUSCH transmissions may be scheduled using the same or using different formats for the respective DL SAs or UL SAs. The advanced-UE may be pre-configured for such behavior and the search and decode process is modified to account for the multiple DL SAs or multiple UL SAs. For example, a separate search and decode process may apply for each of the different DL SAs or UL SAs formats.

For the $L \in \{1,2,4,8\}$ CCE aggregation levels, different values of $M^{(1)}$, $M^{(2)}$, $M^{(4)}$, and $M^{(8)}$ may be used for legacy-UEs and advanced-UEs. One reason may be that advanced-UEs may be fewer and can be always configured to operate as legacy-UEs if the conditions required for supporting transmission at higher data rates and over larger BWs (multiple CCs) are not satisfied. Moreover, even when many advanced-UEs exist in a system, such UEs typically experience high SINRs so that the larger CCE aggregations for respective SA transmissions are less likely than for legacy-UEs, and therefore, the SA candidates for advanced-UEs for the larger (or smaller) CCE aggregation levels should be less (or more) than the ones for legacy-UEs.

In order to minimize the PDCCH size in each CC, the CCEs for SAs to advanced-UEs may be placed with priority in the logical domain before the CCEs for SAs to legacy-UEs as illustrated in FIG. 6. Otherwise, because the number of SAs to legacy UEs may be different among the CCs, in order to maintain the same location of CCEs among primary and secondary DL CCCs for SAs to advanced-UEs, CCEs used for SAs to legacy in one CC may remain empty in another CC, thereby unnecessarily increasing the PDCCH size in the latter CC.

In order to improve interference randomization for the SA transmission to an advanced-UE and statistically average PDCCH loading among the DL CCCs, the primary DL CCC an advanced-UE is configured may pseudo-randomly vary among all DL CCCs. In accordance with an embodiment of the present invention, the pseudo-random function has both UE-specific parameters as inputs, such as the identity assigned to a UE (UE_ID) or a total number C of DL CCCs an advanced-UE is configured with, and UE-common parameters, such as a sub-frame number k. The primary DL CCC in sub-frame k, $C_{P,k}$, can be determined as $C_{P,k} = Z_k$ mod C, where $Y_k = (A \cdot Y_{k-1})$ mod D, where $Z_{-1} = UE\_ID \neq 0$, A=39827, and D=65537. Less frequent variation of the primary DL CCC may also apply. For example, the variation may be per frame (a frame is assumed to consist of 10 sub-frames) and in that case, k denotes the frame number.

By informing an advanced-UE of the DL CCCs it has a scheduled PDSCH reception with or of the UL CCCs it has a scheduled PUSCH transmission with, the advanced-UE becomes aware when it fails to detect the respective DL SA or UL SA. As previously described, such information may be conveyed through explicit signaling in the first DL SA or the first UL SA, respectively, which the advanced-UE is assumed to successfully decode.

When the advanced-UE knows it has been assigned an additional DL SA, but the decoding fails, it can explicitly transmit a discontinuous transmission (DTX) signal instead of a positive or negative HARQ acknowledgement signal, ACK or NAK respectively, as there is no PDSCH reception. When the ACK/NAK transmission is in the PUCCH, another state can be applied to the signal transmission to represent DTX. When the ACK/NAK transmission is in the PUSCH, the advanced-UE may assist its serving Node B with the DTX detection by transmitting, for example, a series of $\{+, -1\}$ bits, or in general, a series of opposite values, in the resources reserved for ACK/NAK transmission in the PUSCH.

Figure 12:
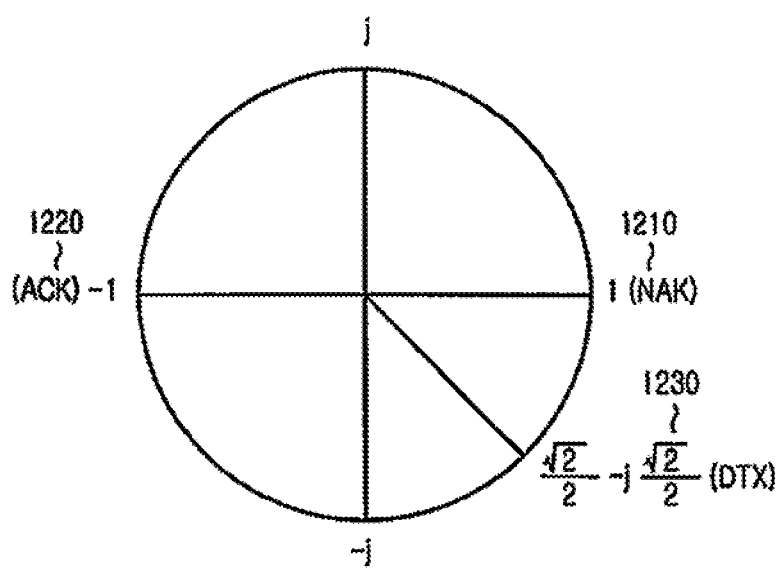
FIG. 12 is a diagram illustrating an explicit transmission of a DTX state from a UE in accordance with an embodiment of the present invention.

FIG. 12 is a diagram illustrating an explicit transmission of a DTX state from a UE in accordance with an embodiment of the present invention. More specifically, FIG. 12 illustrates an explicit DTX transmission in the PUCCH from a UE for missed DL SAs, other than the first DL SA. The values used for the ACK, NAK, and DTX are merely provided as an example.

Referring to FIG. 12, considering 1-bit ACK/NAK transmission, the conventional approach assumes that the UE transmits either a NAK 1210 or an ACK 1220 to indicate the incorrect or correct PDSCH reception, respectively. However, in accordance with an embodiment of the present invention, when the UE is aware of a DL SA that it fails to decode, the DTX state 1230 is introduced in the ACK/NAK signal transmission. The same applies in case a 2-bit ACK/NAK transmission is expected by the serving Node B, where a value of '1' may represent {NAK, NAK}, a value of 'j' may represent {NAK, ACK}, a value of '−1' may represent "ACK, ACK" and a value of '−j' may represent {ACK, NAK}.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for wireless communication supporting carrier aggregation, the method comprising:
   monitoring a first search space and a second search space on a primary component carrier, to receive a scheduling assignment including information indicating a component carrier on which data is transmitted, wherein a scheduling assignment for the primary component carrier is received in the first search space, and a scheduling assignment for a secondary component carrier is received in the second search space;
   transmitting the data on one of the primary component carrier and the secondary component carrier, wherein the first search space for the primary component carrier is different from the second search space for the secondary component carrier.

2. The method of claim 1, wherein the scheduling assignment indicates data transmission on one of a plurality of component carriers.

3. The method of claim 1, wherein the second search space for the secondary component carrier is determined based on the information indicating the component carrier.

4. The method of claim 1, wherein the second search space for the secondary component carrier is positioned away from the first search space for the primary component carrier by a predetermined number of control channel elements.

5. The method of claim 4, wherein the predetermined number of the control channel elements corresponds to the information indicating the component carrier.

6. An apparatus for wireless communication supporting carrier aggregation, the apparatus comprising:
    a transceiver configured to transmit and receive a signal through the wireless communication; and
    a controller configured to control operations of:
        monitoring a first search space and a second search space on a primary component carrier, to receive a scheduling assignment including information indicating a component carrier on which data is transmitted, wherein a scheduling assignment for the primary component carrier is received in the first search space, and a scheduling assignment for a secondary component carrier is received in the second search space, and
        transmitting the data on one of the primary component carrier and the secondary component carrier,
    wherein the first search space for the primary component carrier is different from the second search space for the secondary component carrier.

7. The apparatus of claim 6, wherein the scheduling assignment indicates data transmission on one of a plurality of component carriers.

8. The apparatus of claim 6, wherein the second search space for the secondary component carrier is determined based on the information indicating the component carrier.

9. The apparatus of claim 6, wherein the second search space for the secondary component carrier is positioned away from the first search space for the primary component carrier by a predetermined number of control channel elements.

10. The apparatus of claim 9, wherein the predetermined number of the control channel elements corresponds to the information indicating the component carrier.

11. A method for wireless communication supporting carrier aggregation, the method comprising:
    transmitting a scheduling assignment on a primary component carrier, the scheduling assignment including information indicating a component carrier on which data is transmitted, wherein a scheduling assignment for the primary component carrier is transmitted in a first search space on the primary component carrier, and a scheduling assignment for a secondary component carrier is transmitted in a second search space on the primary component carrier; and
    receiving the data on one of the primary component carrier and the secondary component carrier,
    wherein the first search space for the primary component carrier is different from the second search space for the secondary component carrier.

12. The method of claim 11, wherein the scheduling assignment indicates data transmission on one of a plurality of component carriers.

13. The method of claim 11, wherein the second search space for the secondary component carrier is determined based on the information indicating the component carrier.

14. The method of claim 11, wherein the second search space for the secondary component carrier is positioned away from the first search space for the primary component carrier by a predetermined number of control channel elements.

15. The method of claim 14, wherein the predetermined number of the control channel elements corresponds to the information indicating the component carrier.

16. An apparatus for wireless communication supporting carrier aggregation, the apparatus comprising:
    a transceiver configured to transmit and receive a signal through the wireless communication; and
    a controller configured to control operations of:
        transmitting a scheduling assignment on a primary component carrier, the scheduling assignment including information indicating a component carrier on which data is transmitted, wherein a scheduling assignment for the primary component carrier is transmitted in a first search space on the primary component carrier, and a scheduling assignment for a secondary component carrier is transmitted in a second search space on the primary component carrier, and
        receiving the data on one of the primary component carrier and the secondary component carrier,
    wherein the first search space for the primary component carrier is different from the second search space for the secondary component carrier.

17. The apparatus of claim 16, wherein the scheduling assignment indicates data transmission on one of a plurality of component carriers.

18. The apparatus of claim 16, wherein the second search space for the secondary component carrier is determined based on the information indicating the component carrier.

19. The apparatus of claim 16, wherein the second search space for the secondary component carrier is positioned away from the first search space for the primary component carrier by a predetermined number of control channel elements.

20. The apparatus of claim 19, wherein the predetermined number of the control channel elements corresponds to the information indicating the component carrier.

* * * * *